(12) United States Patent
Deal et al.

(10) Patent No.: US 9,776,189 B2
(45) Date of Patent: Oct. 3, 2017

(54) CHEMICAL REACTOR APPARATUS

(75) Inventors: Martyn Deal, Saffron Walden (GB); Simon Moorhouse, Saffron Walden (GB); Mark Radley, Saffron Walden (GB)

(73) Assignee: R.B. Radley & Co., Ltd., Shire Hill, Saffron Walden, Essex (GB)

( * ) Notice: Subject to any disclaimer, the term of this patent is extended or adjusted under 35 U.S.C. 154(b) by 878 days.

(21) Appl. No.: 13/263,270

(22) PCT Filed: Apr. 8, 2010

(86) PCT No.: PCT/EP2010/054672
§ 371 (c)(1),
(2), (4) Date: Jan. 27, 2012

(87) PCT Pub. No.: WO2010/115968
PCT Pub. Date: Oct. 14, 2010

(65) Prior Publication Data
US 2012/0120757 A1 May 17, 2012

(30) Foreign Application Priority Data

Apr. 8, 2009 (GB) .................................. 0906079.9

(51) Int. Cl.
*B01L 9/00* (2006.01)
*B01F 7/16* (2006.01)
(Continued)

(52) U.S. Cl.
CPC .............. *B01L 9/50* (2013.01); *B01F 7/1695* (2013.01); *B01J 19/0053* (2013.01); *B01J 19/18* (2013.01);
(Continued)

(58) Field of Classification Search
CPC ....................................................... B01L 9/50
(Continued)

(56) References Cited

U.S. PATENT DOCUMENTS

| 1,761,237 A | 6/1930 | Schiff |
| 2,339,439 A * | 1/1944 | Tone ........................ A21C 1/02 |
| | | 366/200 |

(Continued)

FOREIGN PATENT DOCUMENTS

| CH | 614905 | 12/1979 |
| EP | 0940179 | 9/1999 |

(Continued)

OTHER PUBLICATIONS

IKA: "IKA LR-2.ST Operating Instructions", May 1, 2003, XP002610798, retrieved from the Internet: URL:http://www.ika.com/ika/product_art/manual/ika?1r_2_st.pdf, p. 2, p. 17-p. 24, p. 47-p. 49.

(Continued)

*Primary Examiner* — Abbas Rashid
(74) *Attorney, Agent, or Firm* — Nicholas A. Kees; Godfrey & Kahn, S.C.

(57) ABSTRACT

Support apparatus for a chemical reactor vessel comprises a mounting system comprising a collar device (221) arranged for closure around the chemical reactor vessel, and a mounting unit (200) having a member (212) with a hollow, semi-cylindrical receiving portion arranged to receive and support the chemical reactor vessel when fitted with the collar device. The collar device has three radially outwardly extending lugs (223A, 223B, 223C). An upper surface of the member (212) is provided with recesses for receiving and supporting lugs 223A and 223C. A slot in the hollow, semi-cylindrical receiving portion is arranged to receive and support the lug (223B). A chemical reactor vessel fitted with the collar device may be mounted on the apparatus without the need for manual handling of the apparatus, allowing two hands to be used for lifting and mounting the vessel. The lugs (223A, 223B, 223C), recesses and slot cooperate to (Continued)

prevent rotation of the vessel when mounted on the apparatus.

15 Claims, 14 Drawing Sheets

(51) Int. Cl.
    *B01J 19/00*     (2006.01)
    *B01J 19/18*     (2006.01)
    *B01L 9/04*     (2006.01)
    *F16D 1/10*     (2006.01)
    *B01F 7/00*     (2006.01)

(52) U.S. Cl.
    CPC ............... *B01L 9/04* (2013.01); *F16D 1/101* (2013.01); *B01F 7/00266* (2013.01); *B01J 2219/00022* (2013.01); *B01L 2200/025* (2013.01); *B01L 2200/0689* (2013.01)

(58) Field of Classification Search
    USPC .......................... 366/331; 403/289–290, 398
    See application file for complete search history.

(56) References Cited

U.S. PATENT DOCUMENTS

| | | | | |
|---|---|---|---|---|
| 2,481,731 A * | 9/1949 | Dubin | ................. | A23G 3/0215 165/76 |
| 2,766,022 A * | 10/1956 | Bender | ................. | A47J 43/07 277/420 |
| 3,254,386 A * | 6/1966 | McBrien | ................. | B01L 9/50 24/278 |
| 5,339,997 A * | 8/1994 | Billivant | ............. | B01F 15/0235 222/238 |
| 5,522,625 A * | 6/1996 | Flick | ...................... | F16L 23/10 24/279 |
| 5,921,520 A * | 7/1999 | Wisniewski | .............. | F16L 3/12 248/300 |
| 6,116,769 A | 9/2000 | Dewall | | |
| 6,575,652 B2 * | 6/2003 | Krauss | .......................... | 403/49 |
| 6,712,498 B1 | 3/2004 | Yang | | |
| 7,515,673 B2 * | 4/2009 | Jensen | .................. | G21C 19/02 376/302 |
| 7,828,340 B2 * | 11/2010 | Heelan, Jr. | ............ | F16L 21/065 285/366 |
| 8,152,404 B2 * | 4/2012 | Berg | ........................ | F16B 2/10 403/170 |
| 2003/0194265 A1 * | 10/2003 | Krauss | .................... | F16D 1/087 403/49 |
| 2005/0058019 A1 | 3/2005 | Jahn | | |
| 2008/0291776 A1 * | 11/2008 | Brunswick | ............... | A21C 1/02 366/331 |
| 2010/0219185 A1 * | 9/2010 | Griffin | .................. | F16J 13/065 220/4.07 |

FOREIGN PATENT DOCUMENTS

GB               2323139          9/1998
WO     WO2007075167      7/2007

OTHER PUBLICATIONS

International Search Report for PCT/EP2010/054672: mailed Dec. 6, 2010.

* cited by examiner

CHEMICAL REACTOR APPARATUS

The invention relates to chemical reactor apparatus, support apparatus for chemical reactor vessels, mounting systems for mounting chemical reactor vessels on or in support apparatus, agitation systems and devices for use with chemical reactor vessels and chemical reactor apparatus, mounting units for mounting drive units of agitation systems on support apparatus for chemical reactors vessels, coupling devices for coupling fluid-supply hoses to chemical reactor vessels and manifold units for conducting fluids to and from chemical reactor vessels.

A chemical reactor apparatus typically comprises a chemical reactor vessel (normally made of glass) and a support frame for holding the chemical reactor vessel. The support frame also facilitates use of other apparatus and devices in conjunction with the chemical reactor vessel. For example a stirring system for stirring reactants in the chemical reactor vessel may be mounted on the support frame. Hoses for supplying and draining gases or liquids to and from the chemical reactor vessel may have portions attached to the support frame so that accidental pulling on a hose transmits a force to the support frame rather than to the reactor vessel. The support frame typically comprises a series of vertical support rods which surround the chemical reactor vessel when mounted on or in the support frame. Known chemical reactor apparatus comprises a shelf attached to vertical support rods for support of a chemical reactor vessel.

A first aspect of the present invention provides support apparatus for a chemical reactor vessel, said apparatus comprising a mounting system for mounting a chemical reactor vessel on the support apparatus, the mounting system comprising a collar device adapted to be attached around the chemical reactor vessel and a mounting unit adapted to receive the chemical reactor vessel fitted with the collar device, wherein the collar device comprises first and second outwardly extending opposing lugs, and wherein the mounting unit has first and second opposing recesses in a surface thereof, the first and second recesses being configured to receive and support the first and second lugs respectively.

The invention provides the advantage that a chemical reactor vessel which may contain liquid reactants may be easily mounted on the support apparatus without the need to simultaneously handle both the support apparatus and the chemical reactor vessel. Instead, both hands may be used to lift the chemical reactor vessel fitted with collar and the vessel is then simply placed in the mounting unit so that the lugs of the collar fit into and are supported by the recesses of the mounting unit. The vessel is then supported by the support apparatus with the lugs co-operating with the recesses to prevent significant rotation of the vessel. Since the support apparatus itself does not have to be handled in order to install or remove a chemical reactor vessel, apparatus of the invention is especially advantageous when used with a relatively large chemical reactor vessel (e.g. having volume of several liters) which may be filled with liquid reactants and which may have a weight of several kilograms: an operator may use both hands to lift the vessel. The invention also provides the advantage that a chemical reactor vessel supported on the apparatus may be easily changed because the support apparatus does not need to be handled to remove the vessel.

In order to reduce the possibility of rotation of a chemical reactor vessel mounted on the supported apparatus about an axis through the two lugs, preferably the collar device further comprises a third outwardly extending lug and the mounting unit has a third recess in said surface, or more preferably a slot, the third recess, or as the case may be the slot, being configured to receive and support the third lug. A slot is particularly advantageous because it tends to inhibit rotation in either sense about an axis through the first and second lugs.

Installing and removing a chemical reactor vessel is particularly simple if the third lug is located on the collar device at substantially 90° azimuthally with respect to the first and second lugs and the third recess, or as the case may be the slot, is located on the mounting unit at substantially 90° azimuthally with respect to the first and second recesses.

Installation and removal of a chemical reactor vessel, as well as manufacture of the apparatus, are simplified if the lugs lie in a plane parallel to the plane of the collar device and the recesses (or as the case may be the recesses and the slot) are coplanar.

As an alternative to the collar device being provided with lugs and the mounting unit having recesses (or recesses and a slot), the mounting unit may have lugs which extend inwardly and the collar device may have recesses (or recesses and a slot) for receiving the lugs so that the lugs support the collar device.

Conveniently, the mounting unit has a receiving portion for receiving a chemical reactor vessel fitted with the collar device, the receiving portion being in the form of a hollow cylinder. The hollow cylinder may be shallow, i.e. its height or length may be small compared to its diameter so that it forms a second collar-like element which fits around the collar device. The mounting unit may have first and second surfaces which are substantially orthogonal to the longitudinal axis of the hollow semi-cylinder. The mounting unit may thus have the general form of a plate, the receiving portion of the mounting unit being a semi-cylindrical recess in the plate.

The mounting unit may further comprise a first annular clamping arrangement for engaging respective portions of a vessel lid and vessel body of a chemical reactor vessel and biasing the vessel lid and the vessel body together, preferably with a sealing ring between them. The mounting unit may further comprise a second annular clamping arrangement for clamping a vessel lid so that a vessel body and a vessel lid of chemical reactor vessel may be independently mounted on the support apparatus.

Preferably the mounting unit further comprises a spindle member which is substantially parallel to the longitudinal axis of the hollow semi-cylinder, the or each annular clamping arrangement comprising two partially-annular portions hinged on the spindle member. The mounting unit is then able both to support a vessel body fitted with the collar device and also to clamp a vessel lid to the vessel body, preferably with a sealing ring between them. In other words the functions of supporting a vessel body of a chemical reactor vessel fitted with the collar device, and of clamping a lid of the chemical reactor vessel to the vessel body, may be integrated together in the mounting unit.

Preferably the internal annular surface of the first annular clamping arrangement is substantially V-shaped so that as the first annular clamping arrangement is applied to a vessel body and a vessel lid of a chemical reactor vessel, with a sealing ring between them, sloping surfaces of the V-shape cross-section produce forces on the vessel lid and vessel body respectively to bias them together.

The mounting unit is preferably adapted for sliding engagement with a support rod of the support apparatus so that the position of a chemical reactor vessel mounted on the apparatus can be adjusted. The mounting unit preferably includes means for fixing its position along the length of the support rod.

The apparatus may comprise an agitation device, the agitation device comprising a rod mounted for rotation about its longitudinal axis, and an adaptor unit having a first end arranged for detachable engagement with an end of the rod and a second end terminating in a hollow cylindrical end portion having a pin extending radially inwards from the inner surface of said end portion, the adaptor unit being configured such that when engaged with the rod the hollow cylindrical end portion is substantially coaxial with the longitudinal axis of the rod.

The agitation device facilitates agitation (e.g. stirring) of fluid reactants within a chemical reactor vessel mounted on the apparatus. When the adaptor unit is engaged with the rod, the rod may be rotated by means of a drive system having a projecting element which engages with the pin of the adaptor unit. The projecting element and the pin do not need to be carefully aligned to each other, providing for simpler and quicker setting-up of the agitation device compared to those of the prior art. The drive system and the agitation device may be quickly and easily engaged and disengaged.

To provide for more stable and effective rotation of the rod, the hollow cylindrical end portion of the adaptor unit may have two, three four or more pins extending radially inwards from the inner surface of the hollow cylindrical end portion so that the rod may be driven into rotation by two, three, four, or more projecting elements of a drive unit, each of which engages with a respective pin. Preferably there are three pins which are substantially coplanar, and which are arranged within the adaptor unit so that they are orthogonal to the longitudinal axis of the rod when the adaptor is engaged with the rod and such that adjacent pins are inclined at substantially 120°.

In general, the hollow cylindrical portion of the adaptor unit may be provided with n pins extending radially inward; they may be coplanar and adjacent pins may be mutually inclined at an angle 360°/n where n=2, 3, 4 . . . etc.

Conveniently, the rod may be mounted for rotation about its longitudinal axis within a hollow cylindrical guide which is coaxial with the rod, ends of the rod extending beyond respective ends of the hollow cylindrical guide, at least one end of the internal surface of the hollow cylindrical guide being chamfered or rounded-off to prevent wear and/or damage to the rod.

The agitation device may further comprise a cylindrical block having longitudinal axis, a first end adapted for detachable engagement with the chuck of a drive unit and a second end having one or more projecting drive pins extending in respective directions each of which has a component along a direction parallel to the longitudinal axis of the cylindrical block. The rod of the agitation device may be rotated by engaging the first end of the cylindrical block with a chuck of a motorised drive unit of a standard type and engaging the second end of the cylindrical block with the hollow cylindrical end portion of the adaptor unit when attached to the rod. The adaptor unit and the cylindrical block therefore provide a simple system for connecting the rod to a standard type drive unit, which could for example be similar to an electric drill.

The apparatus may comprise first and second substantially parallel support rods and a mounting unit for mounting a drive unit of an agitation system, the mounting unit comprising a first member adapted for sliding engagement with said support rods and means for fixing the position of the first member along the length of the support rods. This allows the position of the drive unit to be adjusted along the support rods. Preferably the mounting unit further comprises a second member adapted for sliding engagement with the first member, the first and second members being arranged such the second member may slide along the first member in a direction substantially orthogonal to said support rods and in the plane of the support rods, the mounting unit further comprising means for fixing the position of the second member along the length of the first member. This allows a drive unit mounted on the mounting unit to be moved in two orthogonal directions, one perpendicular to the support rods and in the plane of the support rods, and another perpendicular to the plane containing the support rods. This makes alignment of the drive unit with other parts of an agitation system simpler. Preferably the second member is adapted for sliding engagement with a rod in a direction substantially orthogonal to the plane of the support rods and comprises means for clamping the rod in a fixed position with respect to the second member. By mounting the drive unit on a rod and engaging this rod with the second member, the drive unit is provided with a third degree of freedom.

In order to limit movement of the first member of the mounting unit along the support rods, the apparatus may further comprise a first collar member adapted for sliding engagement with the first support rod and means for fixing the position of the first collar member along the first support rod. In use of the apparatus, the first collar member may be positioned so that when the first member of the mounting unit is in contact with the first collar member, it has a desired position. For example, when a drive unit is mounted on the mounting unit this position could be a position resulting in engagement of the drive unit with other parts of an agitation system. The first collar member thus acts as a position memory device for the mounting unit, allowing it to be moved away from the desired position as required, and quickly returned to it. The apparatus may further comprise a second such collar member adapted for sliding engagement with the second support rod and means for fixing its position along the second support rod.

The apparatus may comprise a coupling device for providing a sealed connection between a fluid-supply hose and a cylindrical port of a chemical reactor vessel, said port having a radially outwardly extending terminal annular lip, the coupling device comprising a hollow cylindrical spigot and a resilient plastic hollow cylindrical cap, a first end of said spigot being adapted to allow a fluid-supply hose to be secured onto the spigot and a second end of said spigot being adapted for threaded engagement within a first end of the resilient plastic cap and to be pushed onto said port, the coupling device further comprising retaining means for retaining the cap on the port.

The retaining means may comprise a retaining ring engaging the terminal annular lip of the port and further comprises an annular lip at the second end of the cap arranged to engage the retaining ring.

The spigot may be made of PEEK plastic to reduce the probability of damage to the port, where the port is made of glass, compared to a prior art coupling device in which the spigot is made of metal, and may be made substantially from one piece compared to prior art coupling devices which are made from an assembly of two pieces, which decreases the chances of fluid leakages.

The apparatus may comprise a manifold for conducting fluid, the manifold unit comprising a manifold body having an input port and an output port, a layer of thermal insulation and means for attaching the manifold body to a support member of the apparatus such that the layer of thermal insulation is disposed between the support member and the manifold body to substantially thermally isolate the manifold body from the support member. Fluid may be supplied to and/or drained from a chemical reactor vessel mounted on the apparatus by means of hoses connecting the manifold to the chemical reactor vessel and the manifold to a fluid source or drain. Any forced applied to a hose connecting the fluid source/drain to the manifold is transmitted to the apparatus rather than directly to the chemical reactor vessel, providing improved safety and preventing misalignment of and/or damage to the apparatus. Where fluid conducted by the manifold is very hot or very cold, the support member is substantially prevented from being heated or cooled by the layer of thermal insulation. (If the support apparatus becomes very hot or cold, it may expand or contract and sliding parts may not operate properly). The layer of thermal insulation may be PTFE for example.

The apparatus may comprise a support frame having a base portion and at least two support rods extending from the base portion, said support rods being substantially mutually parallel, and wherein the apparatus is arranged such that when a chemical reactor vessel is mounted on the support frame the support rods have an azimuthal extent around the chemical reactor vessel of less than 180°.

This provides the advantage that access to a chemical reactor vessel supported by the apparatus is not impeded by the support frame, thus easing the setting-up, maintenance and monitoring of chemical reactor apparatus comprising the support apparatus. For example operations such as adding reactants to the chemical reactor vessel, adjusting the chemical reactor apparatus, commencing use of an automated stirring arrangement with the chemical reaction vessel and setting-up and dismantling chemical reactor apparatus incorporating the support apparatus are all made easier compared to similar operations on chemical reactor apparatus comprising prior art support apparatus in which a support frame largely or wholly surrounds a chemical reactor vessel when mounted on or in the frame.

The support frame may comprise three support rods extending from the base portion to provide additional strength to the support frame. This is particularly beneficial where the support frame is required to support chemical reactor vessels of large volume, e.g. 1 liter or more, and carrying liquid reactants.

In order to improve the rigidity of the support frame, the support frame preferably includes a rigid brace member attached to the support rods and arranged to maintain the parallelism of the support rods when the reactor vessel is mounted on the support frame. The rigid brace member is preferably arranged for sliding engagement with at least two of said support rods and preferably comprises means for fixing the position of the rigid brace member at a position along the length of the support rods. This allows the brace member to be located at a convenient position along the support rods, allowing greater flexibility when setting up and adjusting the support apparatus, or chemical reactor apparatus comprising the support apparatus.

The base portion of the support frame may have a generally arcuate form in a plane normal to the support rods. This provides the advantage that a drip-tray may be located within the base.

A second aspect of the invention provides a mounting system for mounting a chemical reactor vessel on a support apparatus, the mounting system comprising a collar device adapted to be attached around the chemical reactor vessel, and a mounting unit adapted to be attached to the support apparatus and to receive the chemical reactor vessel fitted with the collar device, wherein the collar device comprises first and second outwardly extending opposing lugs, and wherein the mounting unit has first and second opposing recesses in a surface thereof, the first and second recesses being configured to receive and support the first and second lugs respectively.

A third aspect of the invention provides an agitation device comprising a rod mounted for rotation about its longitudinal axis, and an adaptor unit having a first end arranged for detachable engagement with an end of the rod and a second end terminating in a hollow cylindrical end portion having a pin extending radially inwards from the inner surface of said end portion, the adaptor unit being configured such that when engaged with the rod the hollow cylindrical end portion is substantially coaxial with the longitudinal axis of the rod.

A fourth aspect of the invention provides a mounting unit for mounting a drive unit of an agitation system on a support frame for a chemical reactor vessel, the support frame being of a type having first and second substantially parallel support rods, the mounting unit comprising a first member adapted for sliding engagement with said support rods, and means for fixing the position of the first member along the length of the support rods.

A fifth aspect of the invention provides a coupling device for providing a sealed connection between a fluid-supply hose and a cylindrical port of a chemical reactor vessel, said port having a radially outwardly extending terminal annular lip, the coupling device comprising a hollow cylindrical spigot and a resilient plastic hollow cylindrical cap, a first end of said spigot being adapted to allow a fluid-supply hose to be secured onto the spigot and a second end of said spigot being adapted for threaded engagement within a first end of the resilient plastic cap and to be pushed onto said port, the coupling device further comprising retaining means for retaining the cap on the port.

A sixth aspect of the invention provides a manifold unit for conducting fluid, the manifold unit comprising a manifold body having an input port and an output port, a layer of thermal insulation and means for attaching the manifold body to a support member such that the layer of thermal insulation is disposed between the support member and the manifold body to substantially thermally isolate the manifold body from the support member.

A seventh aspect of the invention provides support apparatus for a chemical reactor vessel, the support apparatus comprising a support frame having a base portion and at least two support rods extending from the base portion, said support rods being substantially mutually parallel, and wherein the apparatus is arranged such that when a chemical reactor vessel is mounted on the support frame the support rods have an azimuthal extent around the chemical reactor vessel of less than 180°.

Embodiments of the invention are described below, by way of example only, and with reference to the accompanying figures, in which.

Figure 1:
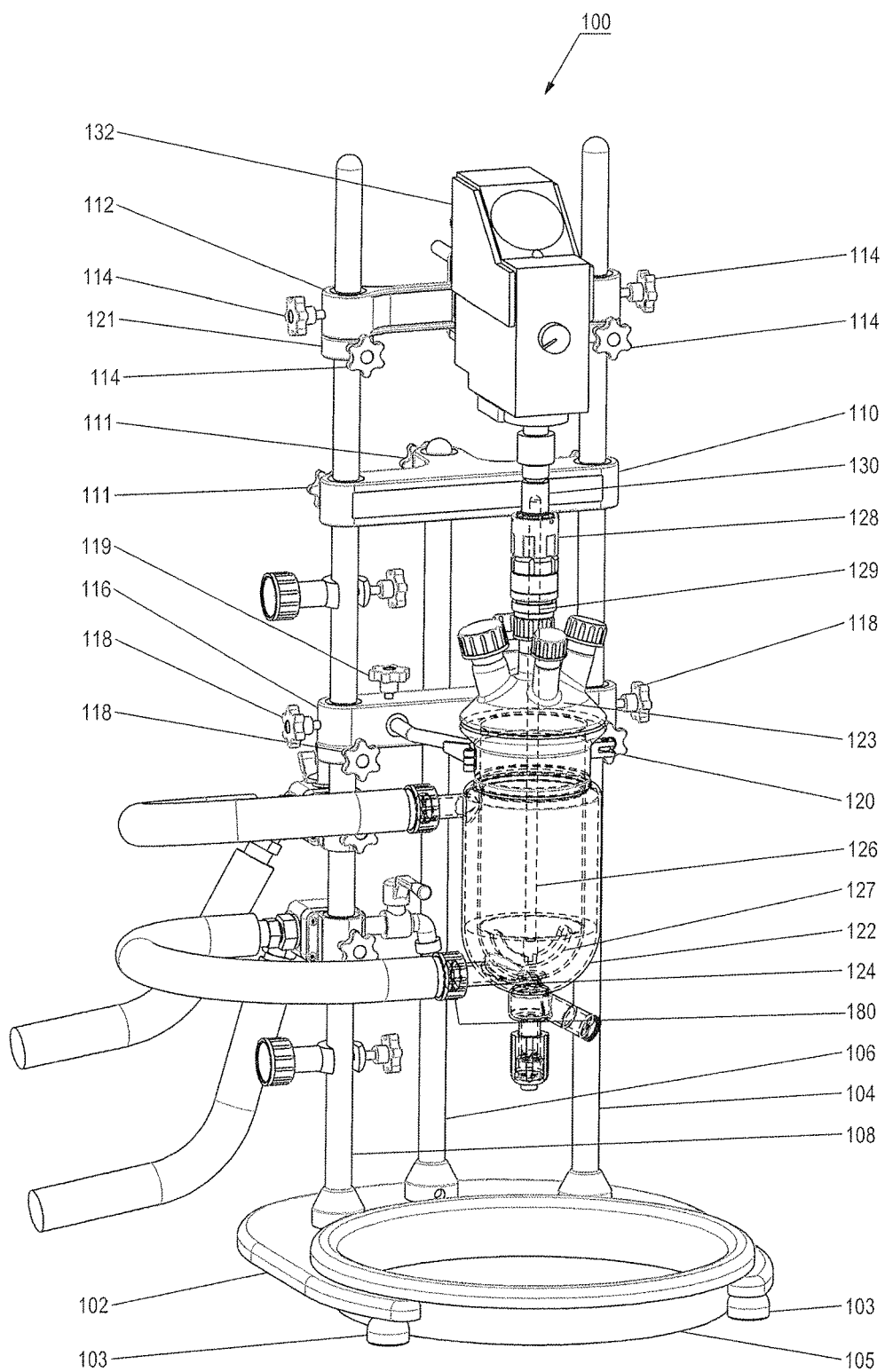
FIG. 1 shows a chemical reactor apparatus.
Figure 2:
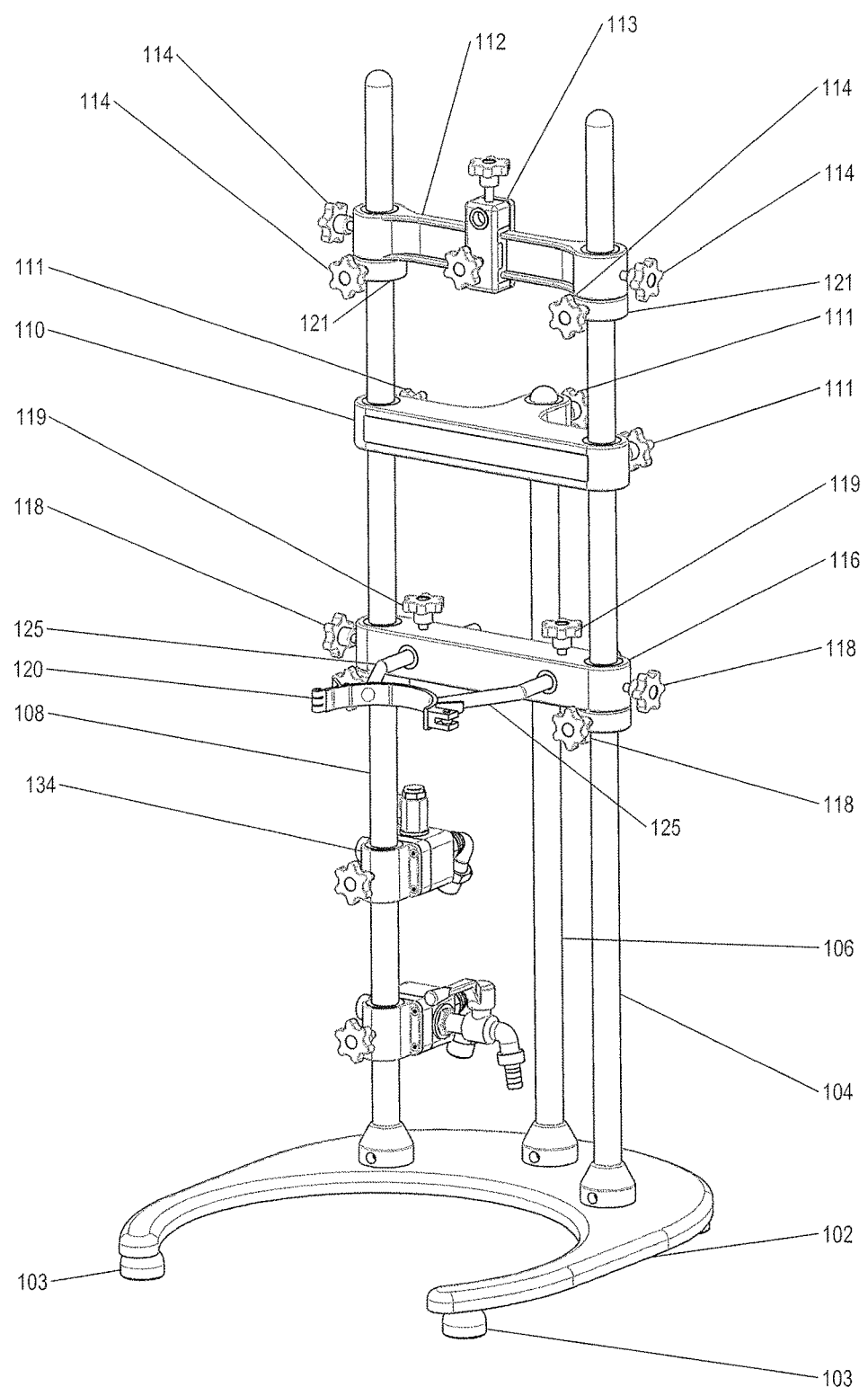
FIG. 2 shows support apparatus comprised in the FIG. 1 apparatus.
Figure 3:
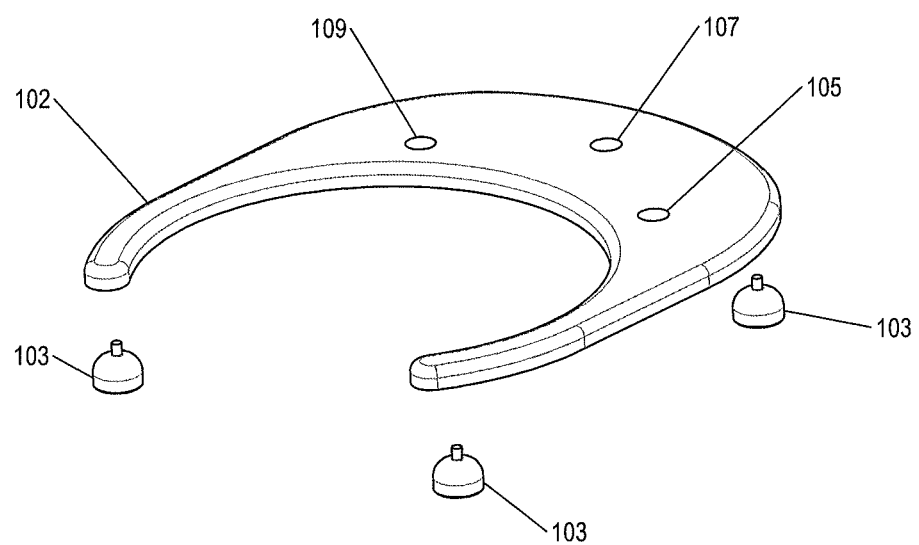
FIG. 3 shows a base portion of the FIG. 2 apparatus.
Figure 4:
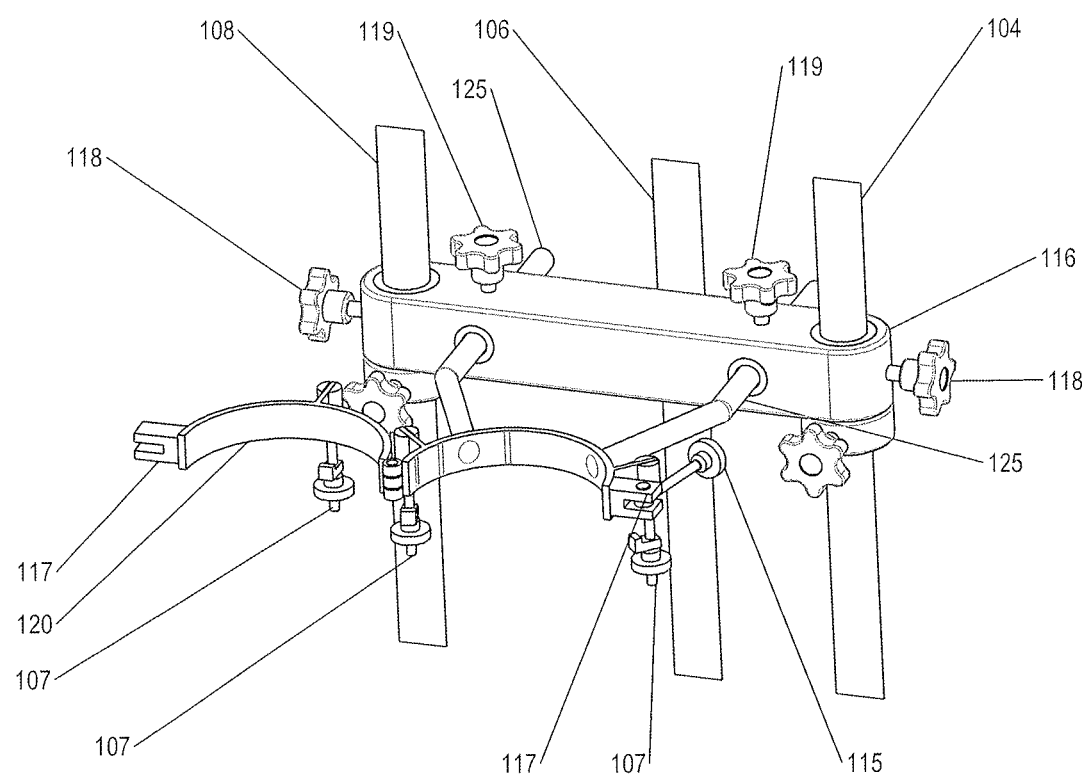
FIG. 4 shows a mounting device comprised in the FIG. 2 apparatus.

FIG. 1 shows a chemical reactor apparatus indicated generally by 100. The chemical reactor apparatus 100 comprises a chemical reactor vessel having a vessel lid 123 and a vessel body 122, the chemical reactor vessel being mounted on support apparatus, parts of which are also shown in FIGS. 2-4. The support apparatus comprises a base portion 102 and support rods 104, 106, 108 extending from the base portion 102. The support rods 104, 106, 108 are substantially mutually parallel and substantially perpendicular to the plane of the base portion 102. The base portion 102 has a generally arcuate form and includes feet 103 which maybe adjusted to level the apparatus 100. A drip-tray 105 is located within the base portion 102. A rigid brace member 110 is slidably engaged with the support rods 104, 106, 108 and provided with screw clamps 111 allowing the rigid brace member 110 to be fixed at a desired location along the length of the support rods 104, 106, 108. The brace member 110 improves the rigidity of the support apparatus and assists in keeping the support rods 104, 106, 108 substantially parallel to each other, particularly when the support apparatus is loaded with a chemical reactor vessel of relatively large volume (e.g. one liter or more) filled with liquid reactants.

Referring also to FIG. 12-15, the apparatus 100 is provided with a stirring arrangement for automated stirring of reactants in the vessel body 122. The stirring arrangement comprises a rod 126 having a paddle 127 at one end. The rod 126 is mounted for rotation about its longitudinal axis within a hollow cylindrical guide 129 which is mounted to pass through the vessel lid 123. The end of the rod remote from the paddle 127 extends beyond guide 129 and is detachably engaged with a first end of a cap element 128 by means of compression of a locking collar activated by threaded engagement of cap element 128 on guide 129. A second end of the cap element 128 terminates in a hollow cylindrical end portion which is co-axial with the rod 126 and has an arrangement of inwardly extending radial pins on its inner surface which engage with projecting pins 162A, 162B, 162C on a cylindrical block 130. The cylindrical block 130 is arranged for rotation by a drive unit 132, which may be motorised or otherwise powered, and which is mounted on a brace 112 which engages with vertical support rods 104, 108. The brace 112 is provided with screw clamps 114 allowing the brace 112 to be fixed at a desired position along the length of the support rods 104, 108. The cylindrical block 130 may be brought into engagement with the cylindrical end portion of a cap 128 by adjusting the position of the brace 112 along the length of the support rods, 104, 108. The drive unit 132 is mounted on the brace 112 to additionally allow movement in a direction substantially perpendicular to the support rods 104, 106, 108. A carriage 113 is mounted for sliding engagement with the brace 112 and comprises a screw clamp for fixing the position of the carriage 113 along the brace 112. Carriage 113 has a hole for receiving a rod to which drive unit 132 is attached. The hole and an associated screw clamp allow the position of the drive unit 132 to be adjusted in a direction normal to the plane containing rods 104, 108, and also rotationally about this direction. Brace 112 and carriage 113 are comprised in a mounting system for drive unit 132, the mounting system also comprising collar clamp devices 121 attached to rods 106, 108. The collar clamp devices 121 have screw clamps 114 which allow their positions along rods 106, 108 to be fixed, and in use may be set at positions such that the cylindrical block 130 is engaged with the hollow cylindrical end portion of detachable cap 128 when brace 112 is in contact with the collar clamps 121. The collar clamps 121 allow the drive unit 132 to be disengaged from the rest of the agitation system (e.g. to allow the vessel lid 123 to be temporarily removed) by sliding brace 112 up the rods 104, 108, but quickly re-engaged by sliding brace 112 down the rods 104, 108 until it contacts the collar clamps 121. The collar clamps 121 thus effectively act as position memory devices for the brace 112, providing simple and fast adjustment of the chemical reactor apparatus 100.

Referring to FIGS. 2 and 4, the apparatus 100 comprises a mounting arrangement for mounting the vessel body 122 on the support apparatus, the mounting arrangement comprising a brace 116 arranged for sliding engagement with support bars 104, 108 and having screw clamps 118 for fixing the position of the brace 116 along the length of the support bars 104, 108. The mounting arrangement further comprises an annular clamp 120 mounted on support rods 125. The brace 116 is arranged for sliding engagement with the support rods 125 and is provided with screw-clamps 119 for fixing the position of the annular clamp 120 with respect to the brace 116. The annular clamp 120 comprises two semi-annular portions which are hinged so that they may be arranged for closure around the vessel body 122. The semi-annular portions of the annular clamp 120 are each provided with a projection 117 extending radially outwardly which may be fastened together around the vessel body 122 by a screw clamp 115.

The vessel lid 123 has an annular collar by which it may be clamped onto the vessel body 122 by means of screw clamps 107 attached to the annular clamp 120.

Figure 5:
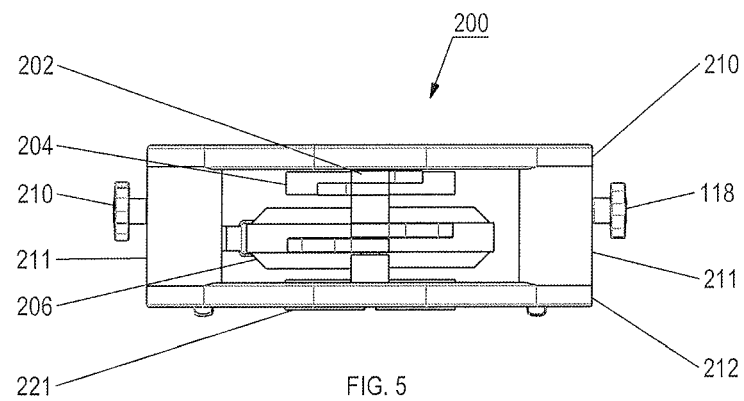
FIGS. 5, 6 and 7 show views of a mounting unit suitable for use with the support apparatus of FIG.
Figure 6:
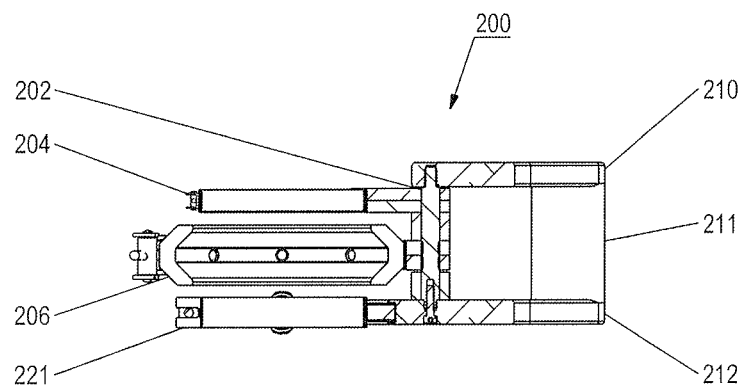
Figure 7:
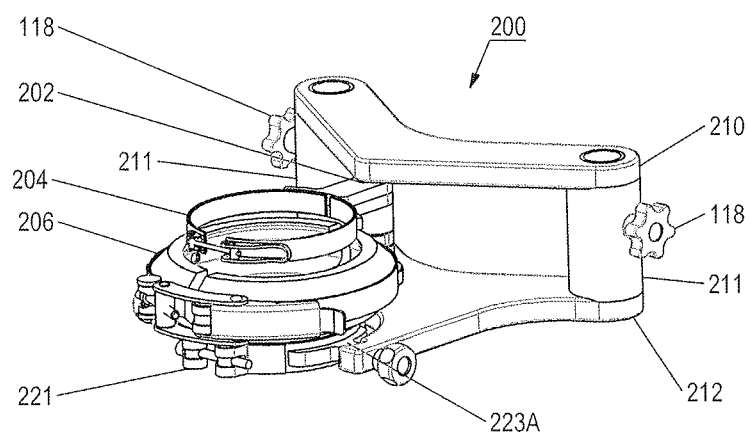
Figure 10:
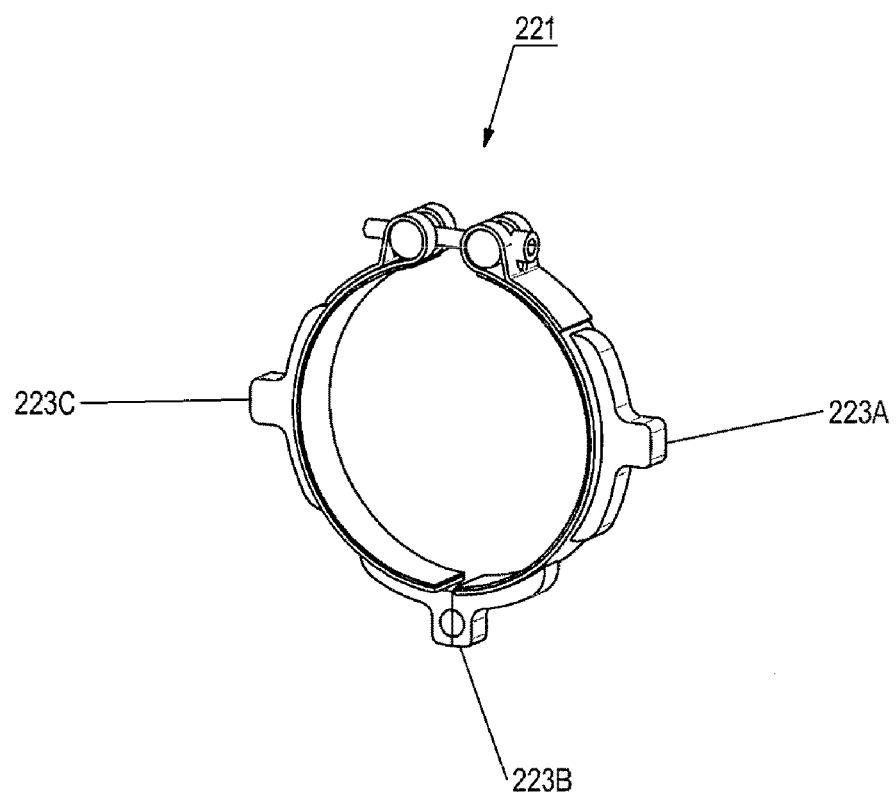
FIG. 10 shows a collar device for securing a chemical reactor vessel in the mounting unit of FIGS. 5, 6 and 7.

FIGS. 5, 6 and 7 show rear, side and perspective views respectively of a mounting unit, indicated generally by 200, for mounting the vessel body 122 and vessel lid 123 on the support apparatus of FIG. 2 in conjunction with a collar device 221 shown in FIG. 10. The mounting unit 200 and the collar device 221 comprise a mounting system for the chemical reactor vessel, the system being an alternative to the mounting arrangement shown in FIG. 4.

The mounting unit 200 comprises two annular clamping arrangements 204, 206 each made-up of two semi-annular portions mounted on a common spindle 202. Clamping arrangement 204 is arranged to hold the vessel lid 123; clamping arrangement 206 is arranged to clamp the vessel lid 123 to the vessel body 122, preferably with a ring seal (not shown) in between.

The mounting unit 200 further comprises two mounting members 210, 212 arranged for sliding engagement with supports rods 104, 108 of the support apparatus of FIG. 2. The mounting members 210, 212 are connected by hollow cylindrical tubes 211, provided with screw clamps 118 for fixing the position of the mounting device 200 along the lengths of the support bars 104, 108. The spindle 202 further connects the mounting members 210, 212. The lower mounting member 212 has a semi-cylindrical hollow recess so that it can receive the vessel body 122 when the vessel body 122 is fitted with the collar device 221 of FIG. 10.

Figure 8:
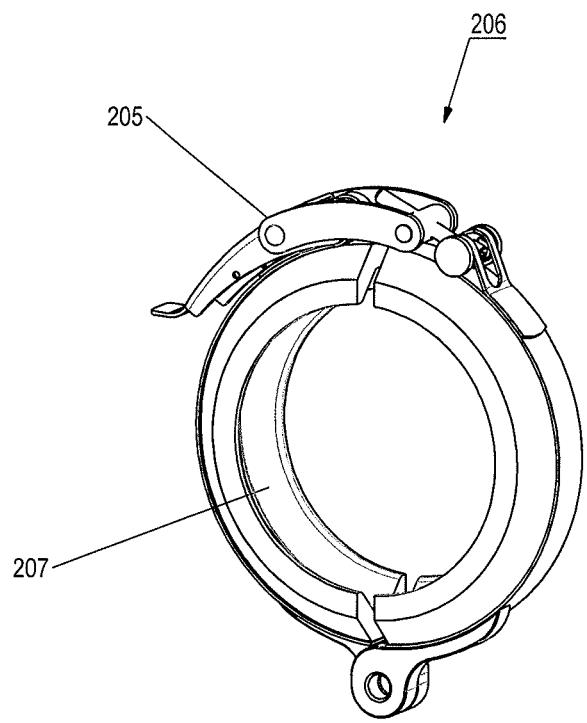
FIGS. 8 and 9 show clamping arrangements comprised in the mounting unit of FIGS. 5, 6 and 7.

Referring to FIG. 8, the annular clamping arrangement 206 for clamping the vessel lid 123 to the vessel body 122 has an internal surface 207 of generally V-shaped form. Once the vessel lid 123 and the vessel body 122 have been clamped, annular lips on the vessel lid 123 and vessel body 122 may be clamped together by closing the semi-annular portions of the clamping arrangement 206 around them and operating a toggle-lever 205 to tighten the annular clamping arrangement 206. This forces the vessel lid 119 and vessel body 122 into contact, possibly with a ring seal (not shown) in between, to clamp them together due to the V-shaped form of the interior of the clamping arrangement 206.

Figure 9:
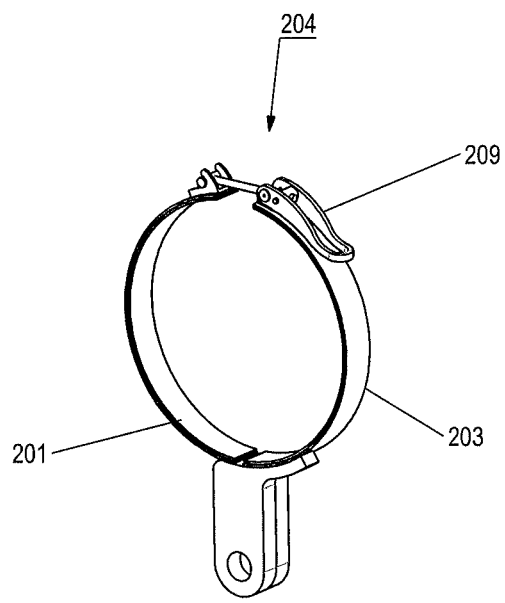

FIG. 9 shows the clamping arrangement 204 for the vessel lid 123. The clamping arrangement 204 comprises two-semi annular portions 201, 203 adapted for independent mounting on the spindle 202 of the device 200. The two semi-annular portions 201, 203 may be closed around the vessel lid 123 and fastened to clamp the vessel lid by closing a toggle-lever 209.

FIG. 10 shows the collar device 221 for use with the mounting unit 200, the collar device 221 second end of the other, to substantially form an enclosed circle when secured together, the being arranged to be clamped around the neck of the vessel body 122. The annular collar device 221 has three radially outwardly extending lugs 223A, 223B, 223C. The collar device 221 comprises two hinged semi-annular portions which carry the lugs 223A, 223B, 223C. The collar device 221 may thus be closed around a vessel body. A hinge for the semi-annular portions is housed within lug 223C.

The lower mounting member 212 of the mounting unit 200 has a receiving portion 213 having a semi-cylindrical hollow recess, allowing the vessel body 122 fitted with the collar device 221 to pass this part of the mounting member 212. The upper surface of the mounting member 212 has three recesses around the edge of the receiving portion, each corresponding to the shape and angular position of a respective lug 223A, 223B, 223C of the collar device 221. When the vessel body 122 is fitted with the collar 221 it may be placed within the receiving portion of the mounting member 212 and rotated so that the lugs 223A, 223B, 223C align with the recesses. The vessel body 122 is then supported on the mounting member 212 by means of the lugs 223A, 223B, 223C and is prevented from rotation due to location of the lugs 223A, 223B, 223C in the recesses in the upper surface of the mounting member 212. Thus when picking up the vessel body 122 with two hands, it may be placed into the receiving portion of the mounting member 212 and rotated to align the lugs 223A, 223B, 223C with recesses in the upper surface of the receiving portion of the mounting member 212. The vessel body 122 is then fixed in position in the device 200 without any further operation having to be carried out, and without any other manual interaction with the support apparatus. Instead of a recess for receiving lug 223B of the collar device 221, the mounting member 212 may have a slot into which lug 223B is placed when mounting the vessel body 122, rather than a recess. The slot prevents rotation of the vessel body 122 about an axis through lugs 223A, 223C in both senses about this axis.

An alternative mounting system of the invention comprises a mounting unit similar to the mounting unit 200 of FIGS. 5, 6 and 7 but having a second semi-cylindrical hollow recess in the lower mounting member 212. The upper surface of the lower mounting member is additionally provided, at the second semi-cylindrical hollow recess, with recesses of the same type and relative positioning as those associated with the hollow semi-cylindrical recess. The mounting unit of the alternative mounting system is therefore able to hold two vessels each of which is fitted with a collar device 221. Extending this principle, further alternative mounting units may be arranged to hold three or more vessels each of which is fitted with a collar device 221.

Figure 11:
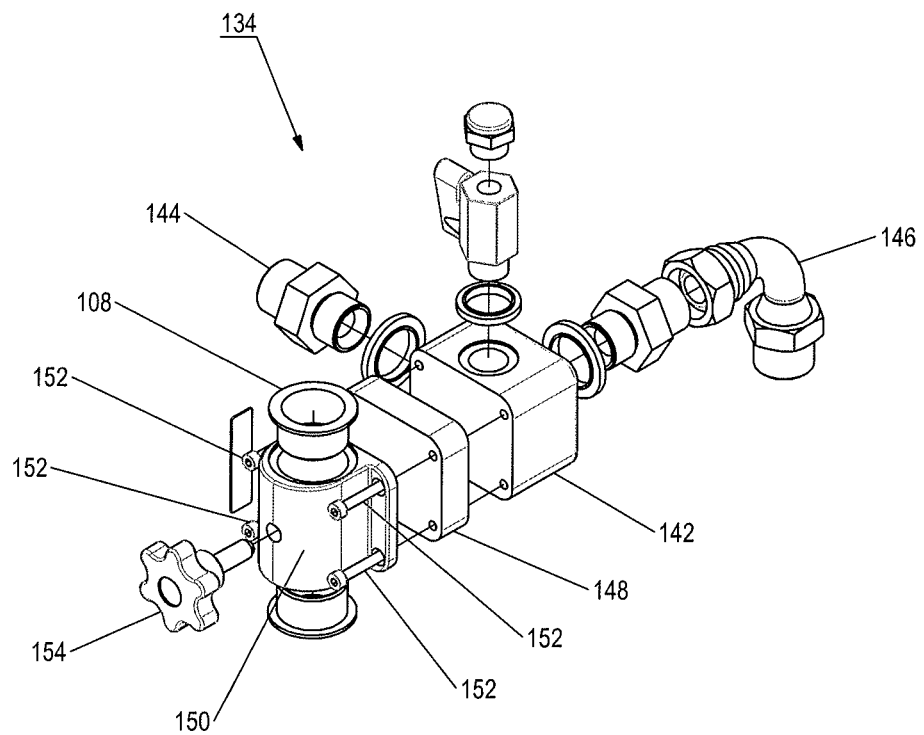
FIG. 11 shows a fluid-conducting manifold of the invention.

FIG. 11 shows an exploded view of the manifold unit 134 comprised in the apparatus of FIGS. 1 and 2. The manifold unit 134 comprises a manifold body 142 having an input port 144 and an output port 146, a PTFE insulating layer 148, a bracket 150, fixing bolts 152 and a screw clamp 154. The fixing bolts allow the manifold body 142 to be clamped to the bracket 150 with the PTFE insulating layer disposed between the bracket 150 and the manifold body 142. The screw clamp 154 allows the manifold unit 134 to be positioned at a desired location along the support rod 108 of the support apparatus shown in FIG. 2.

The manifold unit 134 allows fluid to be supplied to and/or drained from the chemical reactor vessel by means of fluid-supply hoses connecting the vessel body 122 to the manifold unit 134 and connecting the manifold unit 134 to a fluid source/drain (not shown). The manifold unit 134 allows the connection of the chemical reactor vessel to the support apparatus using a relatively short length of hose, thus providing for easy adjustment of the chemical reactor vessel. In addition, accidental pulling of a hose connecting the fluid source/drain to the manifold unit 134 results in a force being transmitted to the support apparatus rather than the vessel body 122. If fluid to be passed to or drained from the vessel body 122 is either very hot or very cold, the PTFE insulating layer 148 of the manifold unit 134 prevents excessive heating or cooling of the support apparatus, thus improving the safety and performance of the apparatus.

Figure 12:
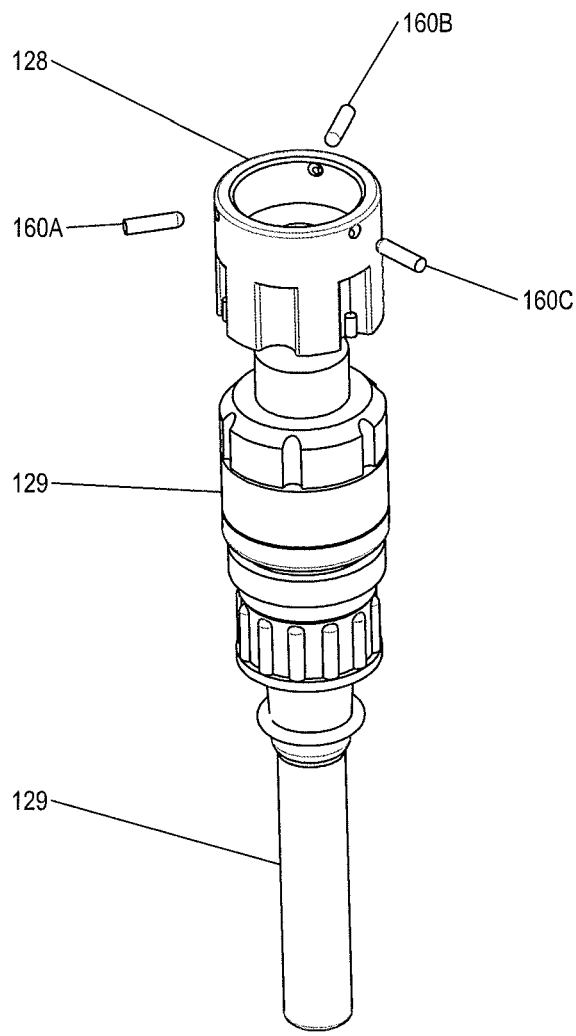
FIGS. 12 to 15 show parts of an agitation system comprised in the FIG. 1 apparatus.

FIG. 12 shows a portion of the stirring arrangement of the FIG. 1 apparatus in detail. The stirring arrangement comprises a hollow cylindrical guide 129 within which the rod 126 (see FIG. 1) is mounted for rotation about its longitudinal axis. One end of the rod 126 extends beyond the guide 129 and is engaged with a first end of a cap element 128. A second end of the cap element 128 terminates in a hollow cylindrical end portion which is coaxial with the longitudinal axis of the rod 126 when the cap 128 is attached to the rod 126. Three pins 160A, 160B, 160C extend radially inwards from the inner surface of the cylindrical end portion of the cap element 128. The pins 160A, 160B, 160C are shown in a withdrawn position in FIG. 12. The pins 160A, 160B, 160C lie in a plane substantially perpendicular to the axis of the rod 126 and adjacent pins are inclined to each other at an angle of substantially 120°.

Figure 13:
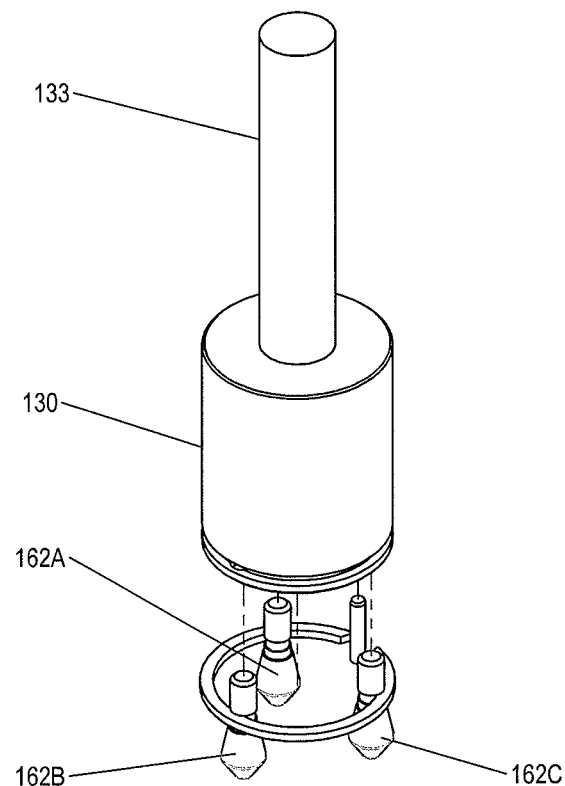

FIG. 13 shows a detailed view of the cylindrical block 130 of the stirring arrangement of the FIG. 1 apparatus. A shaft 133 extends from a first end of the cylindrical block 130, enabling the cylindrical block to be mounted in the drive unit 132, which may be motorised or otherwise powered. Three drive pins 162A, 162B, 162C extend from a second end of the cylindrical block 130. The drive pins 162A, 162B, 162C are equidistant from the longitudinal axis of the cylindrical block 130 and are positioned at azimuthal intervals of substantially 120°.

Figure 14:
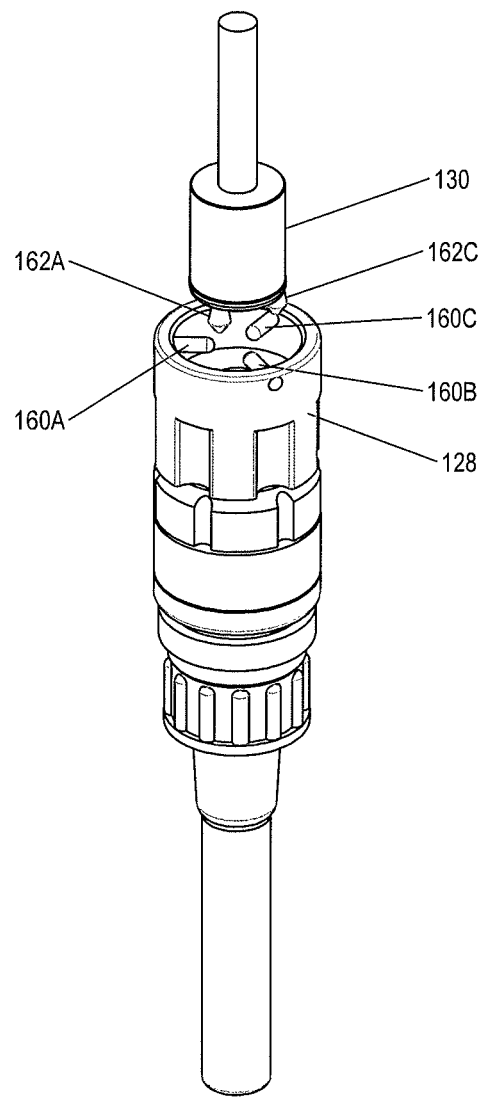
Figure 15:
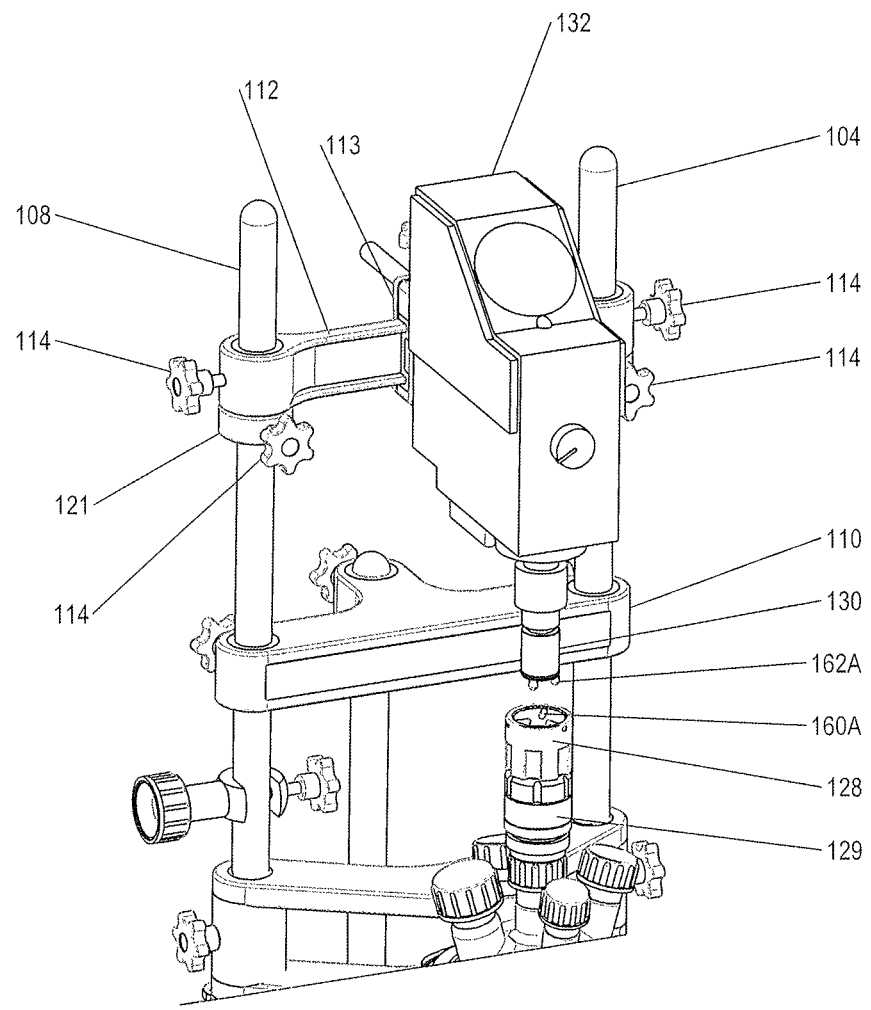

FIGS. 14 and 15 show detailed views of the cylindrical block 130 and of the cylindrical end portion of the cap element 128 in a disengaged condition. To operate the stirring arrangement, the brace 112 is moved down the support rods 104, 108 until the drive pins 162A, 162B, 162C of the cylindrical block 130 enter the cylindrical end portion of the cap 128. The drive unit 132 may also be adjusted in directions perpendicular to the support rods 104, 108 (both parallel and perpendicular to the plane containing rods 104, 108) as described above. Activation of the drive unit 132, which may be motorised or otherwise powered, to rotate the cylindrical block 130 then causes the drive pins 162A, 162B, 162C of the cylindrical block to engage the pins 160A, 160B, 160C of the cap element 128 to provide rotation of the rod 126 and hence paddle 127. The longitudinal axes of the cylindrical block 130 and of the rod 126 need only be approximately aligned in order to engage the cylindrical block 130 and cap element 128, thus reducing the time needed to set up the stirring arrangement compared to arrangements of the prior art. The drive unit 132 may a very general type of device, for example it could be similar to an electric drill. The cylindrical block 130 and the cap element 128 are thus essentially adaptors which allow the rod 126 to be coupled to a quite generic drive unit 132 so that they may be easily and quickly engaged and disengaged.

Figure 16:
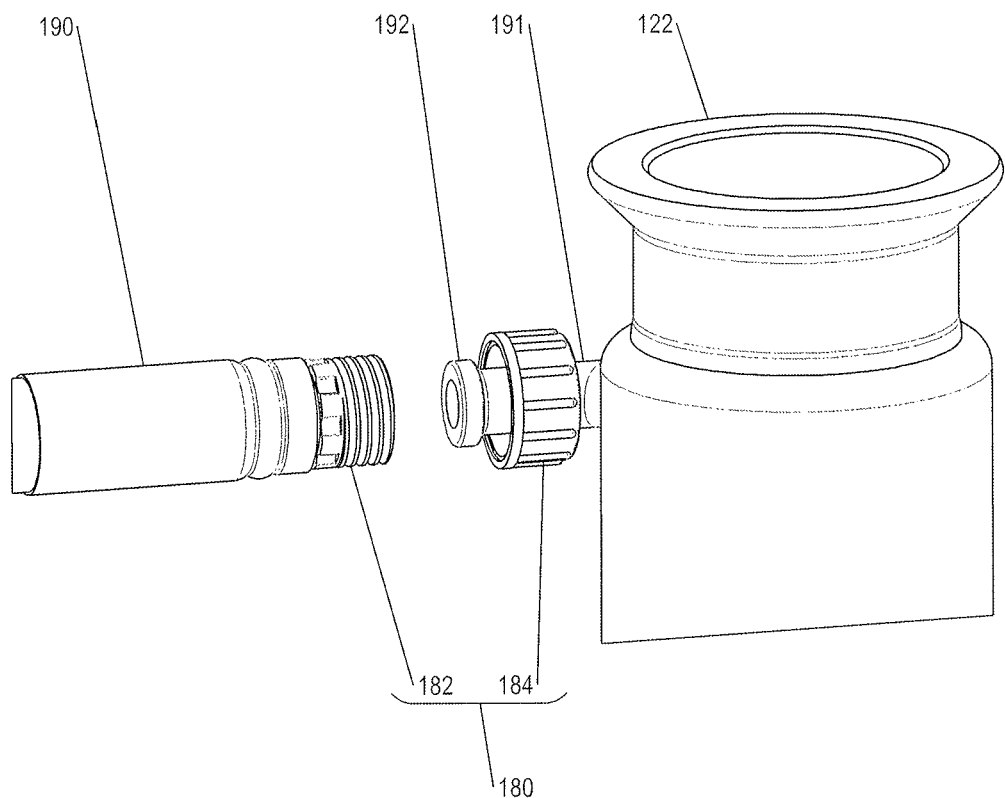
FIGS. 16 and 17 show a coupling device of the invention.
Figure 17:
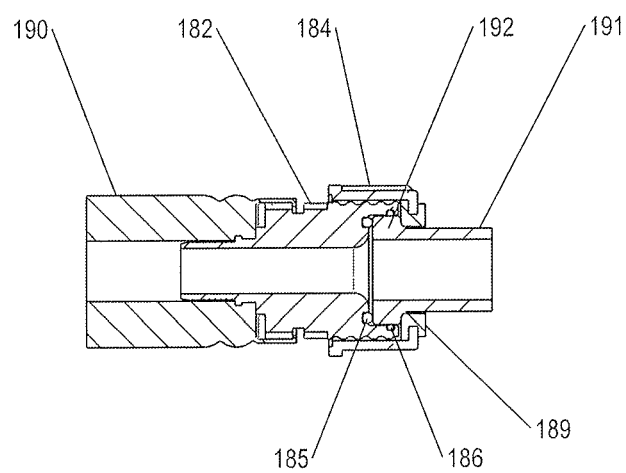

FIG. 16 shows a coupling device 180 of the invention, two such devices being used in the FIG. 1 apparatus for connecting fluid-supply hoses to respective ports of the vessel body 122 of the chemical reactor vessel. FIG. 17 shows a vertical section through the device 180 when in a fastened condition to provide sealed connection between a fluid-supply/drain hose 190 and a port 191 of the vessel body 122. The port 191 has a radially outwardly extending terminal annular lip 192.

The device 180 comprises a PEEK plastic spigot 182 and resilient plastic hollow cylindrical cap 184. The PEEK spigot 182 is adapted at a first end to have a fluid-supply hose 190 pushed onto it and, if necessary, crimped in position. Barbs may be provided on the exterior of the spigot 182 to retain the hose 190. A second end the spigot 182 is provided with a thread on its exterior. The interior of the cap 184 is provided at one end with a complimentary thread allowing the spigot 182 to be screwed into one end of the resilient plastic cap 184 by rotation of the latter. The device further comprises a retaining ring 189 and sealing rings 185, 186. When the spigot 182 is screwed into the cap 184 a lip on the cap 184 engages the ring 189 to prevent the spigot 182 being removed from a terminal annular lip 192 of the port 191.

In the chemical reactor apparatus 100 of FIG. 1, two coupling devices of the invention are used to supply and drain thermoregulating fluid to and from a jacket of the vessel body 122 of the chemical reactor vessel.

The PEEK spigot 182 may have a lining on the interior of its threaded end to provide a more reliable seal with the lip 192. Since the spigot 182 is made of PEEK plastic material, it is less likely to cause damage to a glass port of a reactor vessel body than a similar spigot made of metal.

What is claimed is:

1. A chemical reactor vessel and mounting system for mounting the chemical reactor vessel on a support apparatus,
   the chemical reactor vessel comprising a vessel body and a vessel lid, and
   the mounting system comprising
      a collar device adapted to be attached around the chemical reactor vessel, and
      a mounting unit adapted to be attached to the support apparatus and to receive the chemical reactor vessel fitted with the collar device, wherein the collar device comprises first and second outwardly extending opposing lugs, and wherein the mounting unit has first and second opposing recesses in a surface thereof, the first and second recesses being configured to receive and support the first and second lugs respectively, and wherein the first and second lugs vertically support the vessel body.

2. The chemical reactor vessel and mounting system according to claim 1 wherein the collar device further comprises a third outwardly extending lug and wherein the mounting unit has a third recess in said surface, or alternatively a slot, the third recess, or as the case may be the slot, being configured to receive and support the third lug.

3. The chemical reactor vessel and mounting system according to claim 1 wherein the collar device comprises two hinged semi-annular portions arranged for closure around the chemical reactor vessel.

4. The chemical reactor vessel and mounting system according to claim 3, wherein the collar device further comprises a third outwardly extending lug, and wherein the semi-annular portions are hinged by a hinge mounted within which also forms the third lug.

5. The chemical reactor vessel and mounting system according to claim 2 wherein the third lug is located on the collar device at substantially 90° azimuthally with respect to the first and second lugs and wherein the third recess, or as the case may be the slot, is located on the mounting unit at substantially 90° azimuthally with respect to the first and second recesses.

6. The chemical reactor vessel and mounting system according to claim 2 wherein the first, second and third lugs lie in a plane parallel to a plane of the collar device and wherein the recesses, or as the case may be the recesses and the slot, are coplanar.

7. A chemical reactor vessel and mounting system for mounting the chemical reactor vessel on a support apparatus,
   the chemical reactor vessel comprising a vessel body and a vessel lid, and
   the mounting system comprising a collar device adapted to be attached around the chemical reactor vessel, and a mounting unit adapted to be attached to the support apparatus and to receive the chemical reactor vessel fitted with the collar device, wherein the collar device comprises first and second radially extending opposing lugs, and wherein the mounting unit has first and second opposing recesses in an upper surface thereof, the first and second recesses being configured to receive and support the first and second lugs respectively, wherein the first and second lugs vertically support the whole weight of the vessel body.

8. The chemical reactor vessel and mounting system according to claim 7 wherein the collar device further comprises a third outwardly extending lug and wherein the mounting unit has a third recess in said surface, or alternatively a slot, the third recess, or as the case may be the slot, being configured to receive and support the third lug.

9. The chemical reactor vessel and mounting system according to claim 7 wherein the collar device comprises two hinged semi-annular portions arranged for closure around the chemical reactor vessel.

10. The chemical reactor vessel and mounting system according to claim 9, wherein the collar device further comprises a third outwardly extending lug, coplanar with the first lug and second lug, and wherein the semi-annular portions are joined by a hinge mounted within the third lug.

11. The chemical reactor vessel and mounting system according to claim 8 wherein the third lug is located on the collar device at substantially 90° azimuthally with respect to the first and second lugs and wherein the third recess, or as the case may be the slot, is located on the mounting unit at substantially 90° azimuthally with respect to the first and second recesses.

12. The chemical reactor vessel and mounting system according to claim 8 wherein the first and second lugs and the third lug are coplanar.

13. A chemical reactor vessel and mounting system for mounting the chemical reactor vessel on a support apparatus, the chemical reactor vessel comprising a vessel body having a neck and a vessel lid, and the mounting system comprising a collar device adapted to be attached around the neck of the vessel body, and a mounting unit adapted to be attached to the support apparatus and to receive the chemical reactor vessel fitted with the collar device, wherein the collar device comprises first and second radially extending lugs, and wherein the mounting unit has first and second opposing recesses in a surface thereof, the first and second recesses being configured to receive and support the first and second lugs respectively, and wherein the first and second lugs vertically support the vessel body, and wherein the collar device further comprises a third radially extending lug and wherein the mounting unit includes a slot for receiving and supporting the third lug.

14. The chemical reactor vessel and mounting system according to claim 1 wherein the collar device further comprises first and second arc-shaped portions, each portion having a first end directly secured to the other first end by a hinge, and a second end releasably securable to the other second end, to substantially form an enclosed circle when secured together.

15. The chemical reactor vessel and mounting system according to claim 1 wherein the collar device is removably securable to the vessel body and the first and second lugs are tab-shaped.

* * * * *